US011726284B2

(12) United States Patent
Geens

(10) Patent No.: US 11,726,284 B2
(45) Date of Patent: Aug. 15, 2023

(54) EXTENDER SYSTEM FOR TELECOMMUNICATIONS ENCLOSURES

(71) Applicant: COMMSCOPE TECHNOLOGIES LLC, Hickory, NC (US)

(72) Inventor: Johan Geens, Bunsbeek (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/603,112

(22) PCT Filed: Apr. 10, 2020

(86) PCT No.: PCT/US2020/027688
§ 371 (c)(1),
(2) Date: Oct. 12, 2021

(87) PCT Pub. No.: WO2020/210638
PCT Pub. Date: Oct. 15, 2020

(65) Prior Publication Data
US 2022/0196950 A1 Jun. 23, 2022

Related U.S. Application Data

(60) Provisional application No. 62/833,512, filed on Apr. 12, 2019.

(51) Int. Cl.
*G02B 6/44* (2006.01)
(52) U.S. Cl.
CPC ......... *G02B 6/4445* (2013.01); *G02B 6/4448* (2013.01)
(58) Field of Classification Search
CPC .............. G02B 6/4445; G02B 6/4448

USPC ......................................................... 385/135
See application file for complete search history.

(56) References Cited

U.S. PATENT DOCUMENTS

| 5,005,941 A | 4/1991 | Barlow et al. |
| 5,322,973 A | 6/1994 | Dagan |
| 6,266,469 B1 | 7/2001 | Roth |
| 7,744,288 B2 | 6/2010 | Lu et al. |
| 2007/0272440 A1* | 11/2007 | Grunwald ........... H04M 1/0293 361/752 |
| 2009/0058018 A1 | 3/2009 | Mullaney et al. |
| 2016/0324402 A1 | 11/2016 | Yajima |
| 2017/0010431 A1 | 1/2017 | Coengracht et al. |

(Continued)

FOREIGN PATENT DOCUMENTS

| WO | 2015/120901 A1 | 8/2015 |
| WO | 2017/046190 A2 | 3/2017 |

(Continued)

OTHER PUBLICATIONS

International Search Report and Written Opinion of the International Searching Authority for International Patent Application No. PCT/US2020/027688 dated Jul. 28, 2020, 7 pages.

(Continued)

*Primary Examiner* — Sung H Pak
(74) *Attorney, Agent, or Firm* — Merchant & Gould P.C.

(57) ABSTRACT

A telecommunications enclosure extender couples a first telecommunications enclosure to a second telecommunications enclosure. The extender has enlarged heads that mount at seal arrangement mounting locations of the first and second telecommunications enclosures.

18 Claims, 14 Drawing Sheets

(56) References Cited

U.S. PATENT DOCUMENTS

2018/0267258 A1    9/2018    Takano et al.

FOREIGN PATENT DOCUMENTS

| WO | 2018/204864 A1 | 11/2018 |
| WO | 2019/160995 A1 | 8/2019 |

OTHER PUBLICATIONS

TRAC(TM) Aerial Closure, Data Sheet, Raychem Corporation, 1-2 (1985).

TRACE(TM)—AA, Toolless Re-enterable Aerial Closure Extension Coupler Kit, Raychem System Practive and Installation Instructions, Raychem Corporation, 1-4 (1987).

ICT(TM) E Integrated Closure Terminal Extension, Raychem, System Practive and Installation Instruction, Raychem Corporation, 1-2 (1992).

AIR FOSC Extension Kit: Installation Instructions, Raychem, System Practive and Installation Instruction, Raychem Corporation, 1-4 (1995).

3M(TM) SLiC(TM) Aerial Closures and Terminals: Protecting your aerial network down to the last mile, 3M Communication Markets Division, 1-16 (2017).

Extended European Search Report for Application No. 20788336.4 dated Jan. 2, 2023.

\* cited by examiner

EXTENDER SYSTEM FOR TELECOMMUNICATIONS ENCLOSURES

CROSS-REFERENCE TO RELATED APPLICATION

This application is being filed on Apr. 10, 2020 as a PCT International Patent Application and claims the benefit of U.S. Patent Application Ser. No. 62/833,512, filed on Apr. 12, 2019, the disclosure of which is incorporated herein by reference in its entirety.

TECHNICAL FIELD

The present disclosure relates generally to telecommunications components and systems associated with telecommunications enclosures.

BACKGROUND

Telecommunications system typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, and wave division multiplexers.

SUMMARY

The present disclosure relates generally to components and systems adapted to allow telecommunications enclosures to be assembled in various configurations to meet customer demands. In certain examples, systems in accordance with the principles of the present disclosure allow multiple enclosures to be coupled together to provide enhanced capacity. In this way, the total number of different types and sizes of enclosures provided in a product line can be reduced while maintaining a variety of different installation configuration options and capacities to meet specific customer installation preferences.

Another aspect of the present disclosure relates to a system including a telecommunications enclosure extender for coupling a first telecommunications enclosure to a second telecommunications enclosure. The telecommunications enclosures can include in-line telecommunications enclosures and/or butt-style telecommunications enclosures. An in-line telecommunications enclosure includes cable pass-through locations at opposite ends of the enclosure, while butt-style telecommunications enclosures have cable pass-through locations only at one end of each enclosure. Each cable pass-through location includes a cable sealing arrangement mounting location for mounting a cable sealing arrangement adapted to form seals about cables routed into the enclosure through the cable pass-through location. The cable sealing arrangements typically include sealing gel. The sealing gel can be arranged as a sealing block that may include one or more pieces. The extender body can be configured to mount at the cable sealing arrangement mounting locations of the two telecommunications enclosures desired to be coupled together. The extender can mount at the cable sealing arrangement mounting locations in place of at least portions of cable sealing arrangements that normally would be mounted at the cable sealing arrangement mounting locations. In a preferred example, the extender includes a fiber passage for allowing optical fibers to be routed between the telecommunications enclosures coupled together by the extender. In a preferred example, the extender is environmentally sealed at each of the telecommunications enclosures to which the extender is coupled.

Another aspect of the present disclosure relates to a telecommunications enclosure extender for coupling a first telecommunications enclosure to a second telecommunications enclosure. The first and second telecommunications enclosures respectively include first and second cable sealing arrangement mounting locations for mounting cable sealing arrangements. The telecommunications enclosure extender includes an extender body having first and second opposite ends. The extender body has an internal fiber passage extending through the extender body from the first end to the second end. The extender body includes an enlarged first sealing head positioned adjacent the first end. The enlarged first sealing head is configured to mount at the first cable sealing arrangement mounting location in place of at least a portion of the corresponding cable sealing arrangement. The extender body also includes an enlarged second sealing head positioned adjacent the second end. The enlarged second sealing head is configured to mount at the second cable sealing arrangement mounting location in place of at least a portion of the corresponding cable sealing arrangement. The extender body further includes an intermediate section between the first and second enlarged sealing heads. The intermediate section has a reduced outer transverse cross-sectional profile as compared to the enlarged first and second sealing heads.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings which are incorporated in and constitute a part of the description, illustrate several aspects of the present disclosure. A brief description of the drawings is as follows.

DETAILED DESCRIPTION

Figure 1:
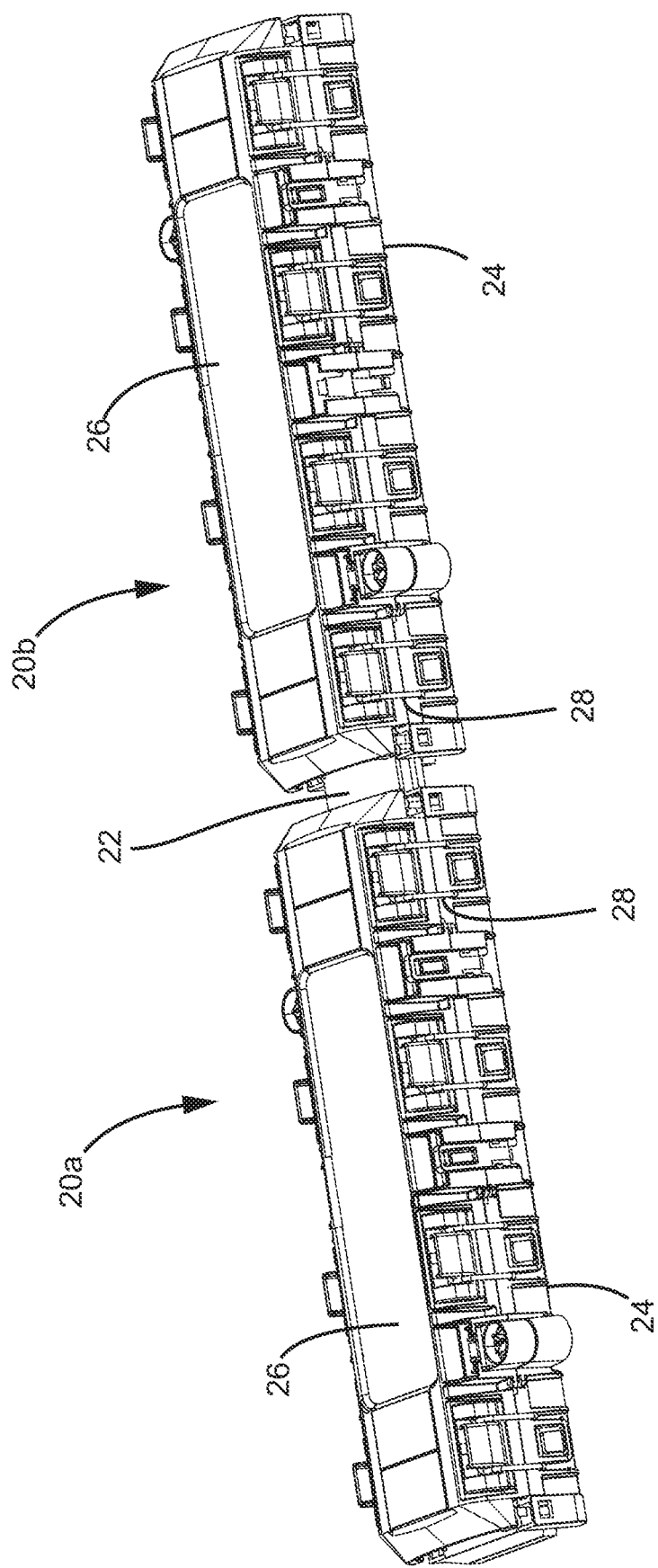
FIG. 1 depicts two in-line telecommunications enclosures coaxially coupled by a telecommunications enclosure extender in accordance with the principles of the present disclosure.
Figure 2:
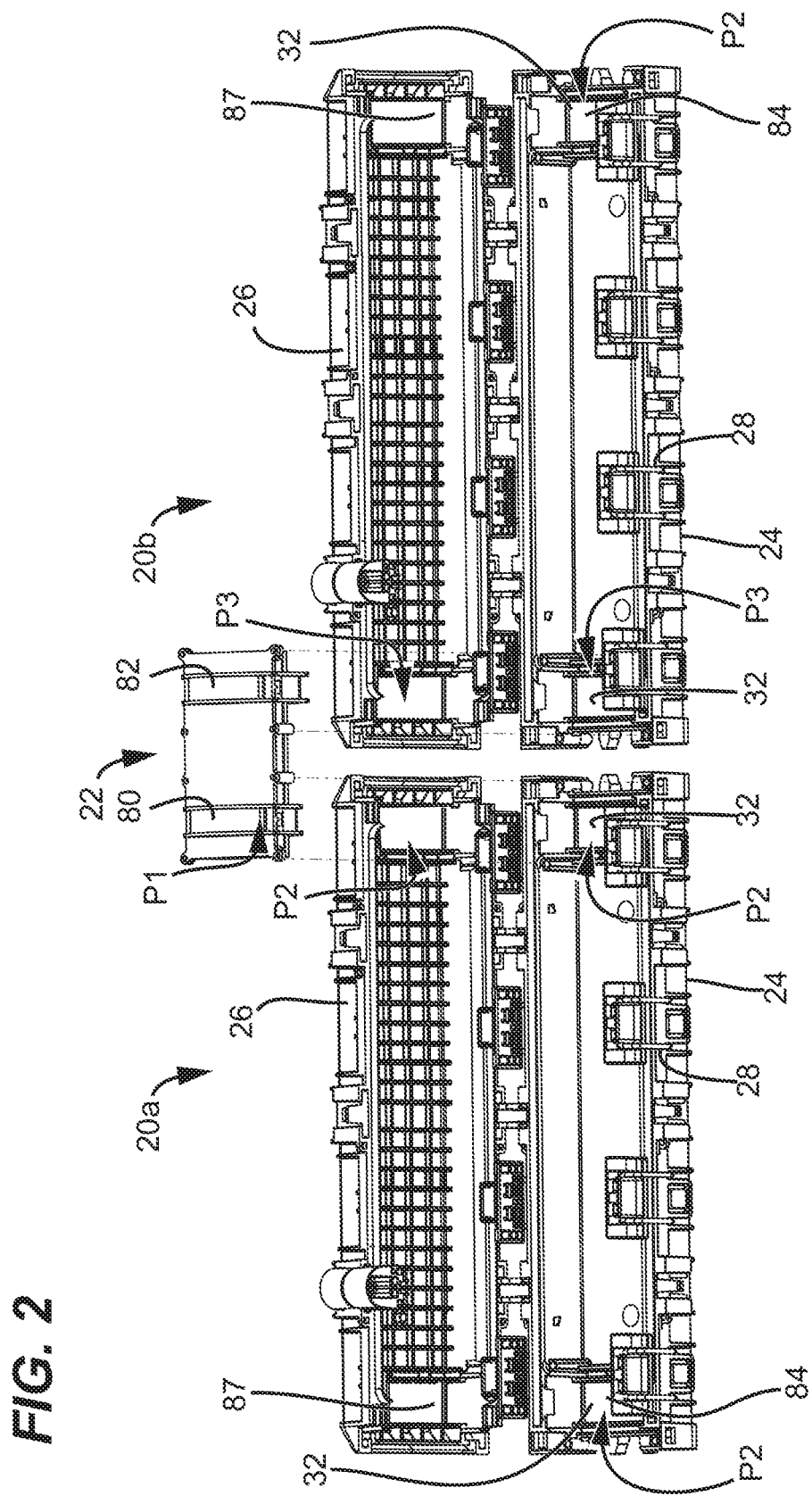
FIG. 2 depicts the assembly of FIG. 1 with the in-line telecommunications enclosures in an open configuration and the telecommunications enclosure extender exploded away from the enclosures to better reveal the telecommunications enclosure extender and the corresponding cable sealing arrangement mounting locations.
Figure 3:
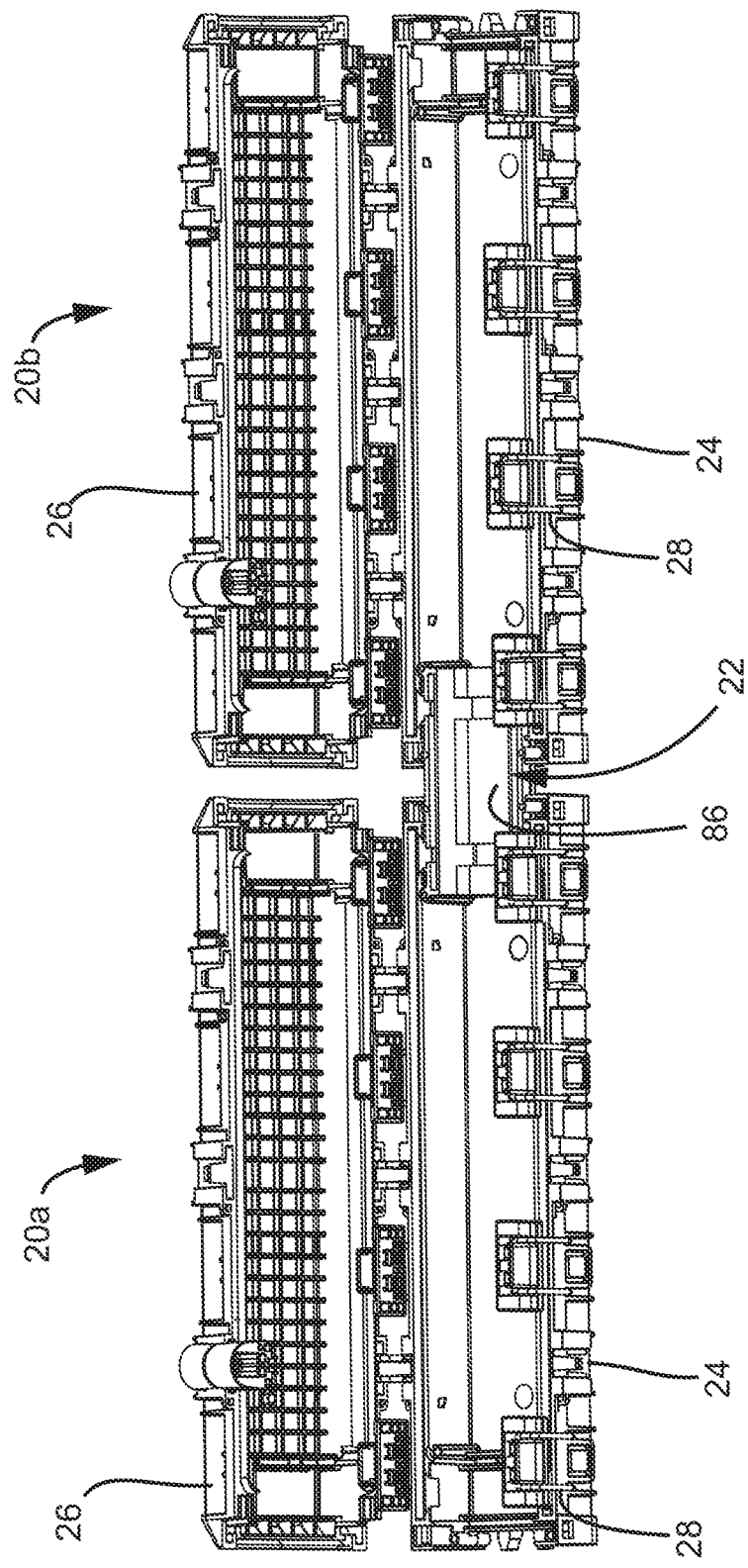
FIG. 3 depicts the assembly of FIG. 2 in an assembled state and with a cover removed from the telecommunications enclosure extender to reveal an internal fiber passage.

FIGS. 1-3 depict first and second telecommunications enclosures 20a, 20b linked in a co-axially aligned manner by a telecommunications enclosure extender 22 in accordance with the principles of the present disclosure. Each of the first and second telecommunications enclosures 20a, 20b includes a base 24 and cover 26. The base 24 and the cover 26 can be separated from one another to allow access with respect to an interior of each enclosure 20a, 20b. In certain examples, the base 24 and the cover 26 can optionally be connected together by hinges. Preferably, latches 28 can be used to secure the base 24 and the cover 26 in a closed position. In a preferred example, environmental sealing is provided between the base 24 and the cover 26.

It will be appreciated that the telecommunications enclosures 20a, 20b are preferably configured for housing and protecting telecommunications equipment for providing numerous functionality such as optical fiber management, optical fiber storage, splicing between optical fibers, optical power splitting, wavelength division multiplexing, and connectorized optical coupling between optical fibers. In certain examples, trays can be provided within the enclosures 20a, 20b for managing optical fiber, for holding optical splices, for holding optical splitters and wavelength division multiplexers, and the like. In other examples, fiber management spools or other fiber management structures for facilitating routing optical fibers within the enclosure can be provided. In the depicted examples, the enclosures 20a, 20b do not include ruggedized exterior connector ports for receiving hardened fiber optic connectors from outside the enclosures. However, in other examples, the telecommunications enclosures may be provided with hardened fiber optic adapter ports for receiving hardened fiber optic connectors from outside the enclosure. Example hardened fiber optic adapters and fiber optic connectors are disclosed by U.S. Pat. No. 7,744,288 which is hereby incorporated by reference in its entirety.

Figure 4:
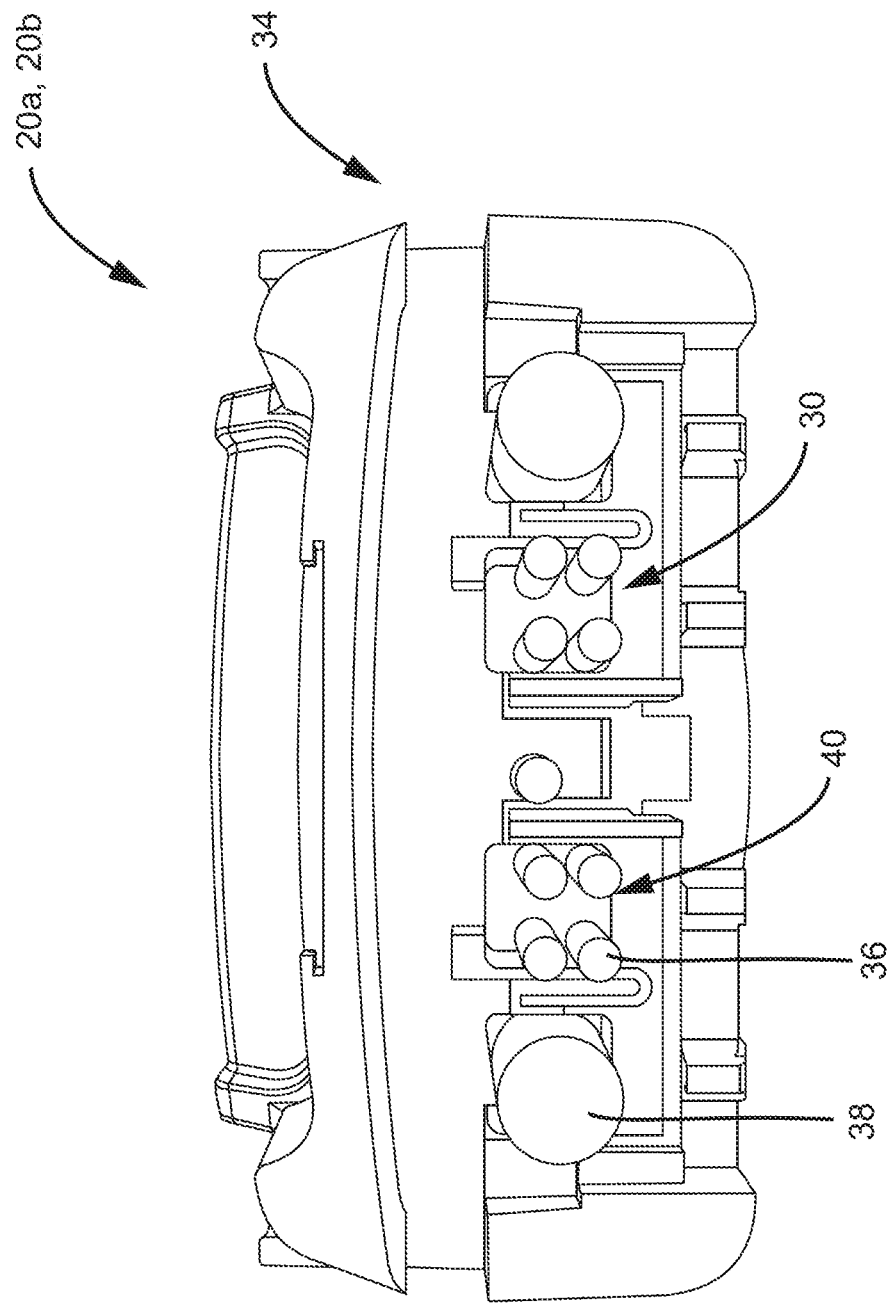
FIG. 4 is an end view of one of the telecommunications enclosures of FIG. 1 showing a cable pass-through location of the enclosure with telecommunications cables routed through the pass-through location.

Referring to FIGS. 2 and 3, the first and second telecommunications enclosures 20a, 20b each have an in-line configuration with cable pass-through locations 30 located at opposite ends of the enclosures 20a, 20b. FIG. 4 depicts an enclosure end 34 representative of one of the ends of the first or second telecommunications enclosures 20a, 20b. One of the cable pass-through locations 30 is defined through the end 34 and fiber optic cables 36, 38 of different diameters are shown routed through the cable pass-through location 30 into the interior of the enclosure 20a or 20b.

Figure 5:
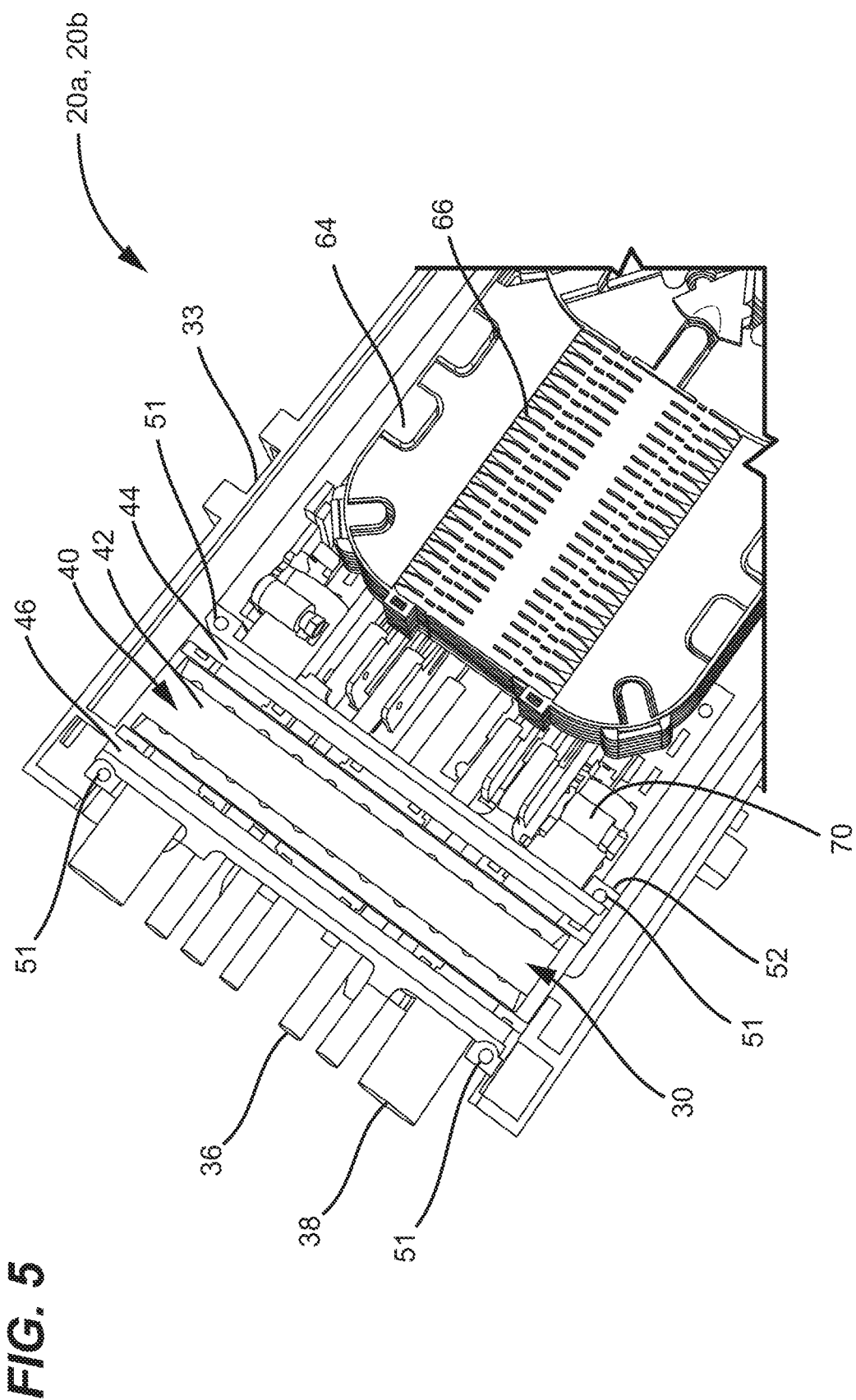
FIG. 5 shows the cable pass-through location of FIG. 4 with a cover of the telecommunications enclosure removed to reveal a cable sealing arrangement mounted at a cable sealing arrangement mounting location defined at the cable pass-through location.
Figure 6:
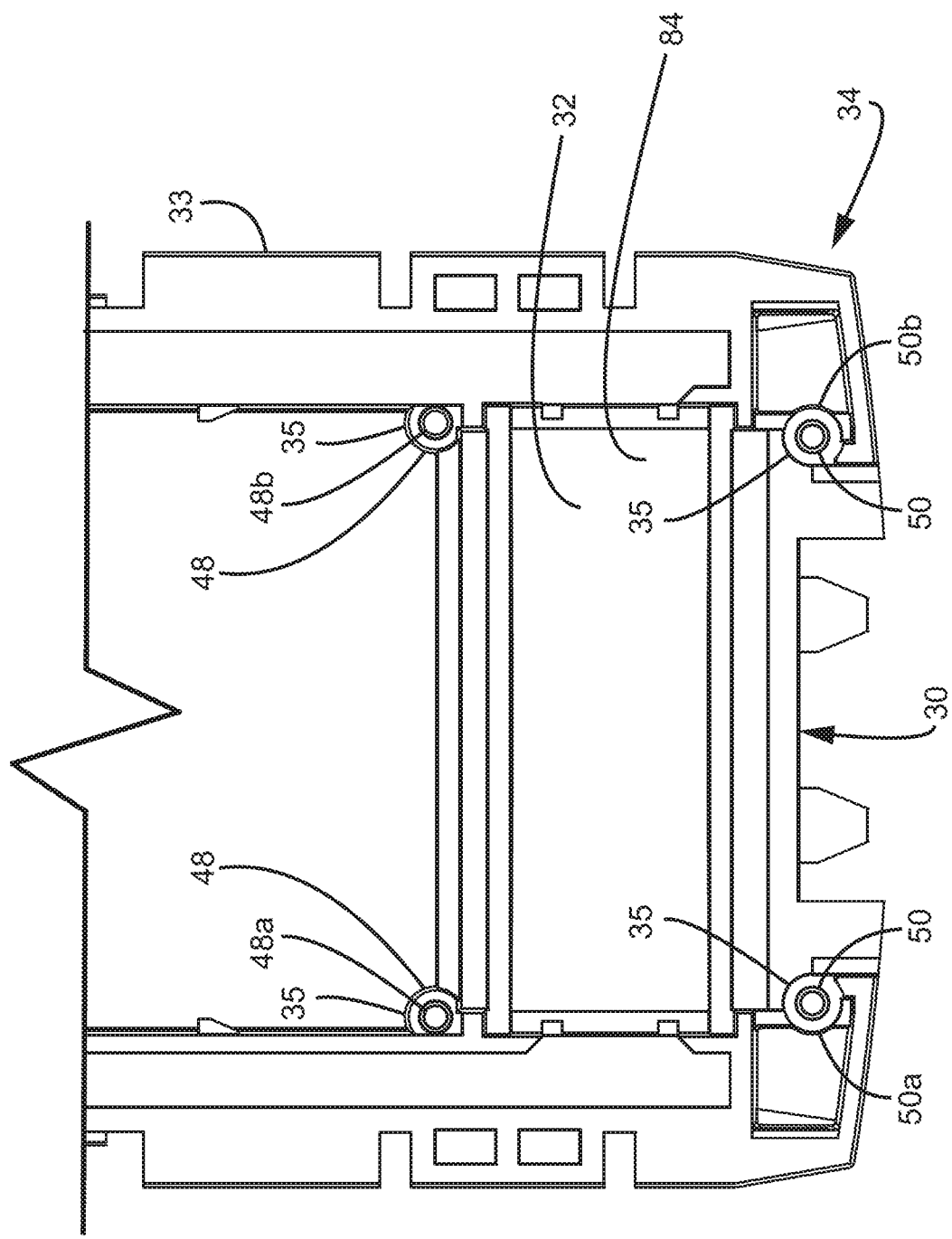
FIG. 6 is a top plan view of the cable sealing arrangement mounting location of FIG. 5.

FIGS. 5 and 6 show the enclosure 20a, 20b with the cover 26 removed such that the cable pass-through location 30 is more visible. A cable sealing arrangement 40 is shown mounted at the cable pass-through location 30. In FIG. 6, the cable sealing arrangement 40 has been removed such that a sealing arrangement mounting location 32 corresponding to the cable pass-through location 30 is visible. The cable sealing arrangement 40 includes a sealant arrangement 42 including one or more volumes of sealant (e.g., gel) configured to form seals about the fiber optic cables 36, 38. The sealant arrangement 42 is contained between inner and outer containment structures 44, 46 that are attached to a main housing 33 of the telecommunications enclosure 20a or 20b and that function to maintain containment of the sealant arrangement 42 when the sealant arrangement 42 is pressurized to form seals about the cables 36, 38. Example sealant arrangements and gel types are disclosed by International Application No. PCT/US2019/017904, which is hereby incorporated by reference in its entirety.

Referring still to FIG. 6, the housing of the telecommunications enclosure 20a or 20b includes an inner connection interface 48 positioned to correspond to the inner containment structure 44 and an outer connection interface 50 positioned to correspond to the outer containment structure 46. As depicted, the inner containment interface 48 includes first and second connection points 48a, 48b and the outer connection interface 50 includes first and second connection points 50a, 50b. In certain examples, the connection points 48a, 48b, 50a, 50b can be configured for providing mechanical connections such as snap-fit connections or fastener-based connections. As depicted, each of the connection points 48a, 48b, 50a, 50b can include a fastener receptacle defined by the housing of the enclosure 20a or 20b for receiving a fastener that engages the corresponding containment structure 44, 46. For example, the connection points 48a, 48b, 50a, 50b can include screw openings defined by bosses 35 integrated with the housing 33 of the enclosure 20a or 20b. The bosses 35 are configured receive screws which pass-through corresponding openings 51 defined by the inner and outer containment structures 44, 46 (e.g., defined by ears 52 of the containment structures).

Referring again to FIG. 5, the enclosure 20a or 20b is shown containing a tray 64 such as a splice tray having splice holders 66 and a fiber storage region 68. Additionally, the depicted telecommunications enclosure 20a or 20b is shown including cable anchoring locations 70 positioned adjacent the cable sealing arrangement 40 for attaching the cables 36, 38 to the housing of the enclosure 20a or 20b by clamps, straps or other means.

Referring back to FIG. 3, the telecommunications enclosure extender 22 is shown coupling the first and second telecommunications enclosures 20a, 20b. As shown in FIG. 2, the telecommunications enclosure extender 22 includes an enlarged first sealing head 80 that fits within the cable sealing arrangement mounting location 32 of the first telecommunications enclosure 20a in place of at least a portion of the cable sealing arrangement 40, and an enlarged second sealing head 82 that fits at the cable sealing arrangement mounting location 32 of the second telecommunications enclosure 20*b* in place of at least a portion of the cable sealing arrangement 40. It will be appreciated that the telecommunications enclosure extender 22 can be installed between the first and second telecommunications enclosures 20*a*, 20*b* by opening the enclosures 20*a*, 20*b* as shown at FIG. 2, and then loading the telecommunications enclosure extender 22 in place by inserting lower portions of the enlarged sealing heads 80, 82 into corresponding receptacles 84 defined by the bases 24 of the telecommunications enclosures 20*a*, 20*b*. As so positioned, the telecommunication enclosure extender 22 traverses a distance between the first and second telecommunications enclosures 20*a*, 20*b* and defines a fiber passage 86 that provides communication between the interiors of the telecommunications enclosures 20*a*, 20*b*. When the telecommunications enclosures 20*a*, 20*b* are closed, upper portions of the enlarged sealing heads 80, 82 fit within corresponding receptacles 87 defined by the covers 26. Thus, the first enlarged sealing head 80 mounts between the cover 26 and the base 24 of the first telecommunications enclosure 20*a* and the second enlarged sealing head 82 mounts between the cover 26 and the base 24 of the second telecommunications enclosure 20*b*. In certain examples, perimeter sealing material (e.g., gel) is positioned within the receptacles 84, 87 and forms a radial seal that extends around the perimeters of the sealing heads 80, 82. In other examples, perimeter sealing material 89 can be mounted around sealing perimeters of the sealing heads 80, 82 (see FIG. 10).

Figure 8:
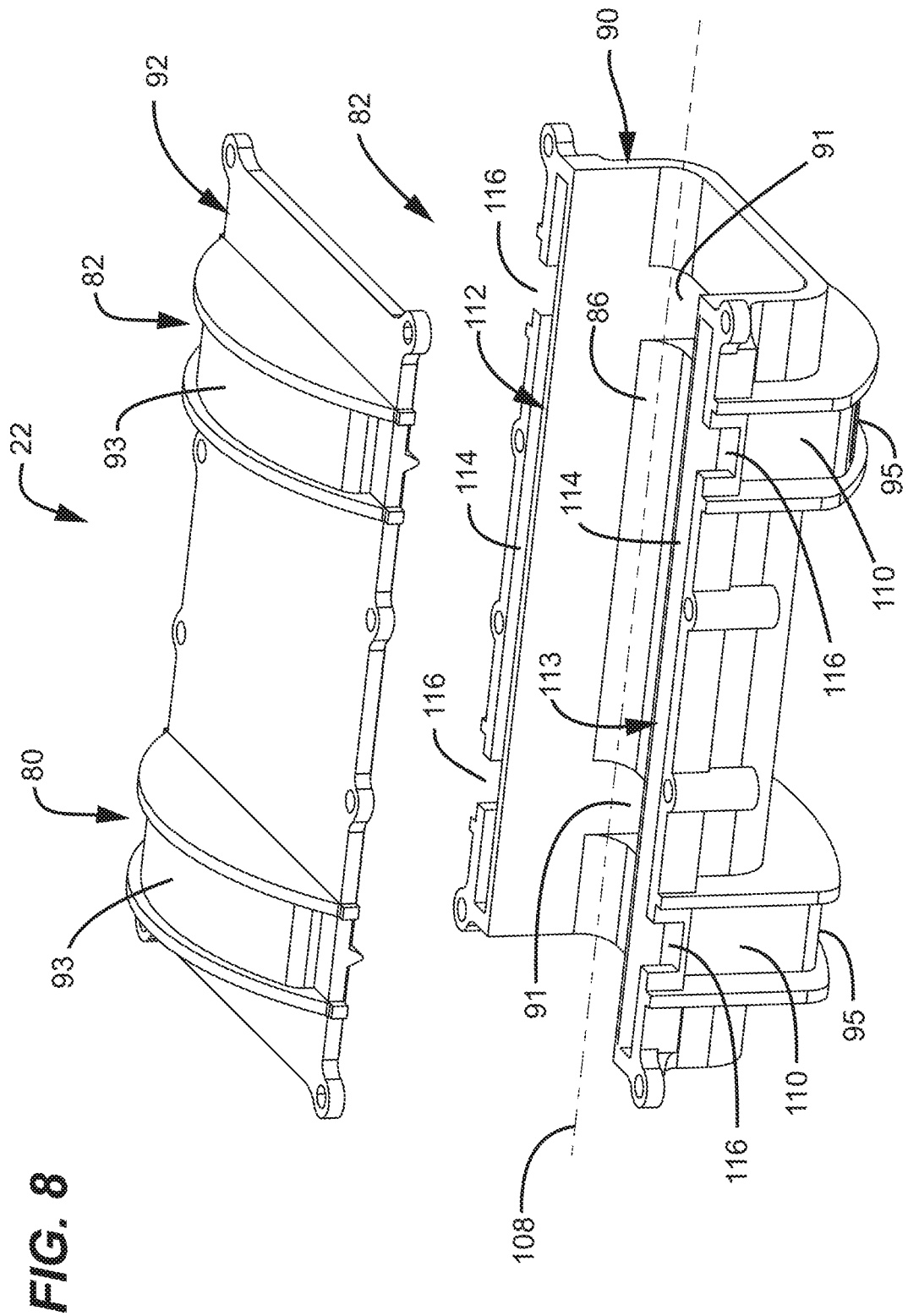
FIG. 8 is an exploded view of the telecommunications enclosure extender of FIG. 7.

Referring to FIG. 8, the telecommunications enclosure extender 22 can have a multi-piece construction. For example, the telecommunications enclosure extender 22 can include two pieces depicted as a base piece 90 and a cover piece 92. The base piece 90 and the cover piece 92 can be secured together by a snap-fit connection or by fasteners. Preferably, the coupling interface between the base piece 90 and the cover piece 92 allows the cover piece 92 to be selectively removed from the base piece 90. When the cover piece 92 is removed from the base piece 90, the fiber passage 86 is exposed along the length of the telecommunications enclosure extender 22 such that fibers can be laid into the fiber passage 86 without requiring the fibers to be longitudinally threaded through the fiber passage 86. In other words, optical fibers can be laid downwardly into the base piece 90, and then the cover piece 92 can be mounted over the fibers within the base piece 90 such that the extender 22 wraps around the optical fibers and has a "wrap-around" type configuration.

Figure 7:
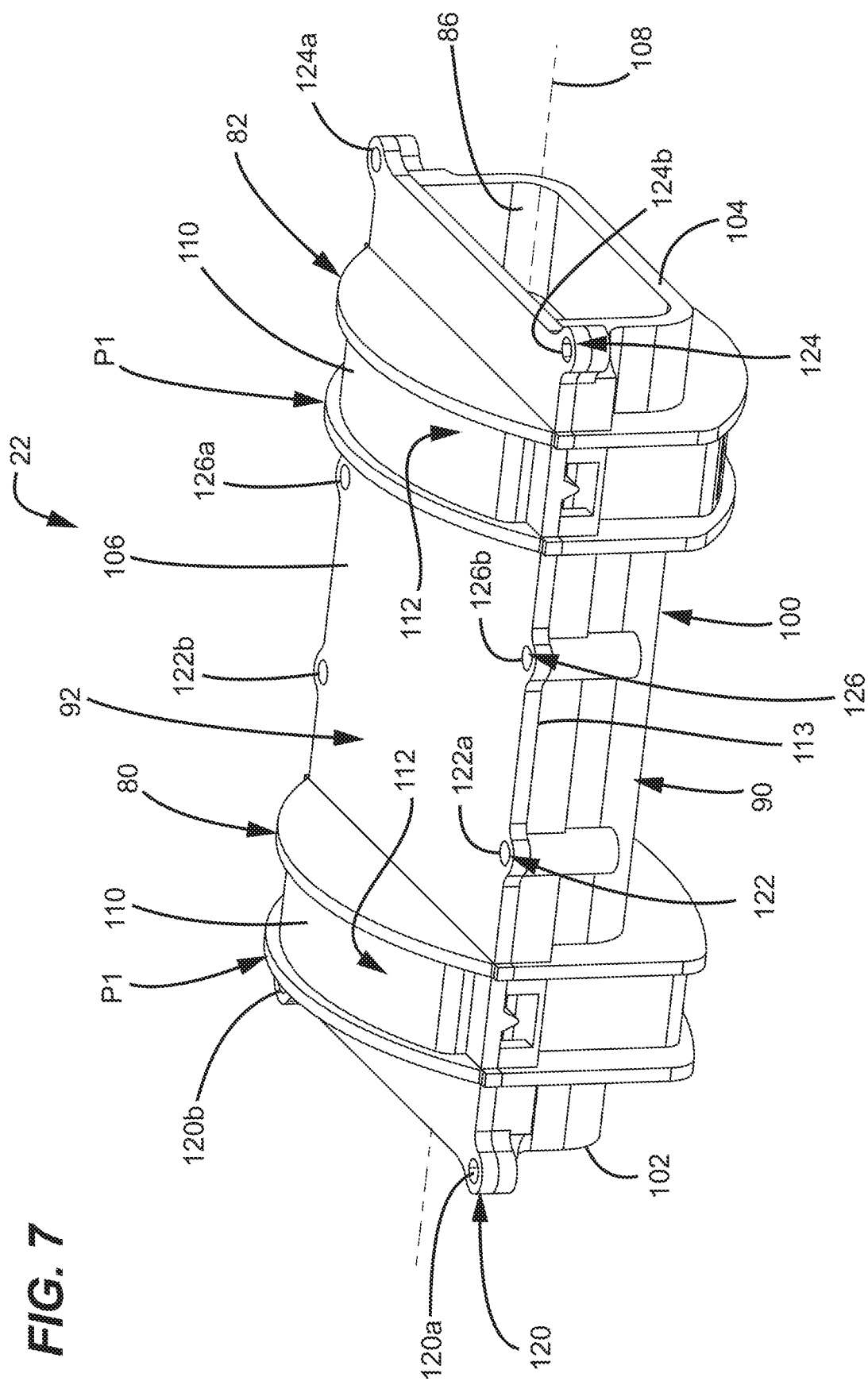
FIG. 7 is a perspective view of the telecommunications enclosure extender of FIGS. 1-3.

Referring to FIGS. 7-10, the telecommunications enclosure extender 22 includes an extender body 100 having first and second opposite ends 102, 104. The fiber passage 86 defined by the extender body 100 extends through a length of the extender body 100 from the first end 102 to the second end 104. The enlarged first sealing head 80 is positioned adjacent to the first end 102 and the enlarged second sealing head 82 as positioned adjacent the second end 104. The extender body 100 defines a central axis 108 that extends longitudinally through the extender body 100 between the first and second ends 102, 104. The extender body 100 also includes an intermediate section 106 that extends axially between the enlarged first and second sealing heads 80, 82. The intermediate section 106 has a reduced outer transverse cross-sectional profile as compared to the enlarged first and second sealing heads 80, 82. In the embodiment of FIGS. 6 and 7, the enlarged first and second sealing heads 80, 82 have the same outer profiles P1.

Referring to FIG. 2, the base 24 and the cover 26 of the first telecommunications enclosure 20*a* cooperate to define sealing assembly mounting locations 32 each having an inner profile P2 that matches the outer profile P1 of the enlarged first sealing head 80. Similarly, base 24 and the cover 26 of the second telecommunications enclosure 20*b* cooperate to define sealing assembly mounting locations 32 having inner profiles P3 that match the outer profiles of the enlarged second sealing head 82. In the case of the assembly of FIGS. 1-3, the inner profiles P2 of the first telecommunications enclosure 20*a* have the same size and shape as the inner profiles P3 of the second telecommunications enclosure 20*b*.

In preferred examples, the telecommunications enclosure extender 22 has a molded plastic construction and includes one or more pieces. As depicted, the telecommunications enclosure extender 22 has a two-piece construction which includes the base piece 90 and the cover piece 92. Upper portions 93 of the enlarged sealing heads 80, 82 are unitarily integrated with the cover piece 92 and lower portions 95 of the enlarged sealing heads 80, 82 are unitarily integrated with the base piece 90. The enlarged sealing heads 80, 82 each define a sealing perimeter 110 that extends around the central axis 108. At least when the telecommunications enclosure extender 22 is mounted between the first and second telecommunications enclosures 20*a*, 20*b*, the enlarged first and second sealing heads 80, 82 engage perimeter sealing material that extends around the sealing perimeters 110 to provide radial sealing between the sealing perimeters 110 of the sealing heads 80, 82 and interiors of the telecommunications enclosures 20*a*, 20*b*. In other examples, axial sealing may be used in addition to radial sealing, or in place of radial sealing. In preferred examples, the enlarged first and second sealing heads 80, 82 define perimeter channels 112 that extend around the central axis 108 for receiving the radial perimeter sealant. As shown at FIG. 10, perimeter sealing material 89 is shown secured to the exterior of the extender body 100 within the perimeter channels 112.

Figure 9:
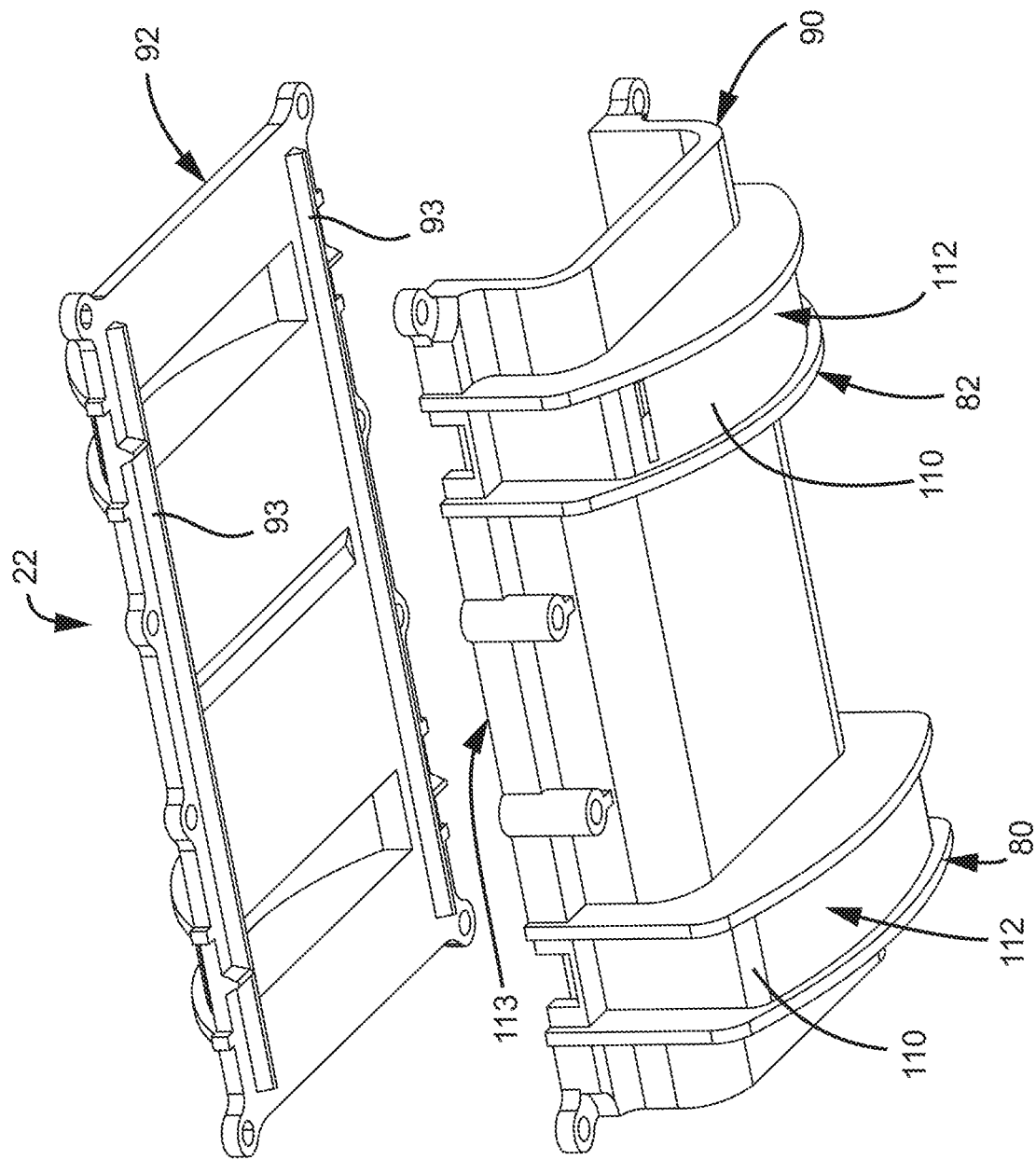
FIG. 9 is another exploded view of the telecommunications enclosure extender of FIG. 7.
Figure 10:
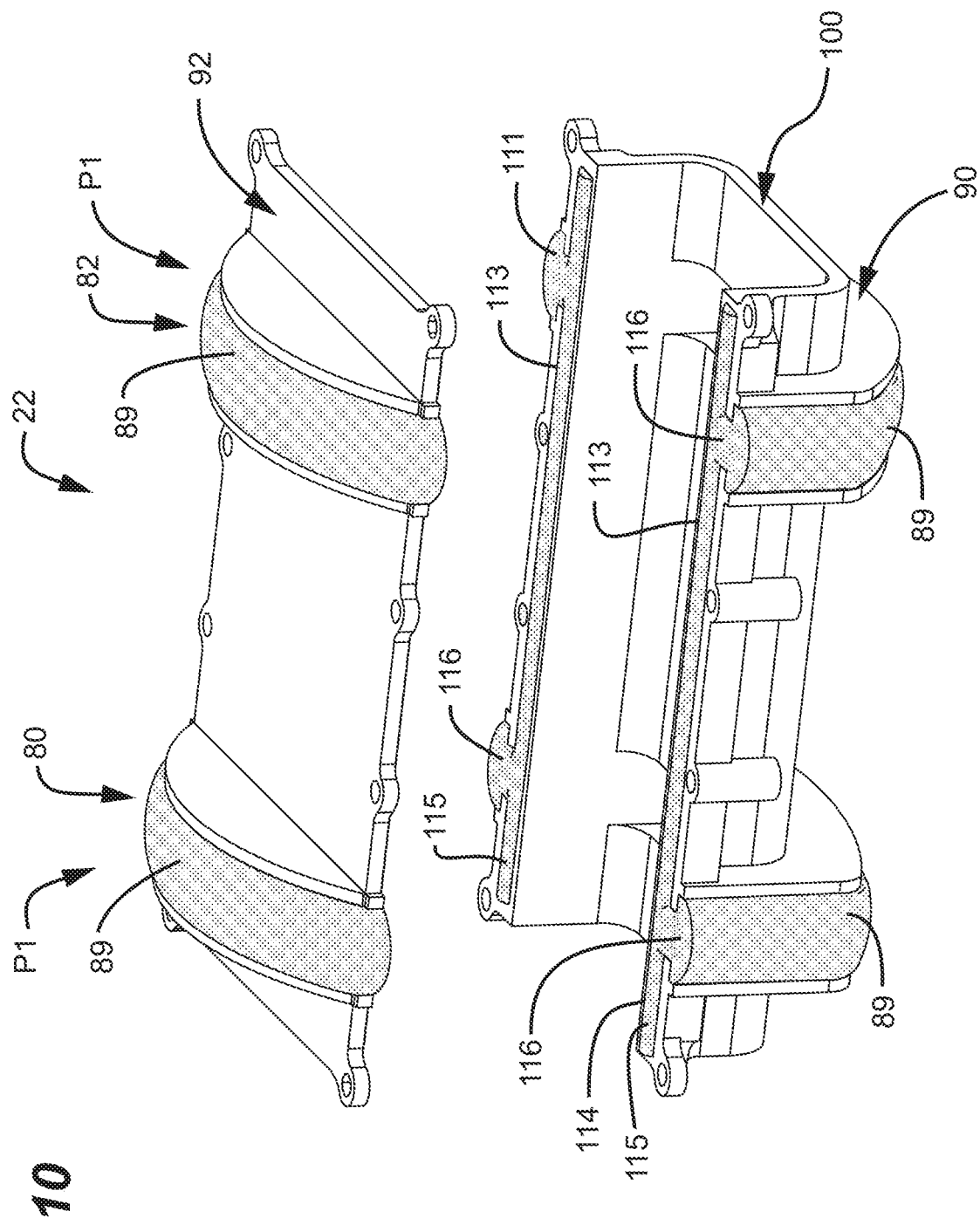
FIG. 10 is an exploded view of the telecommunications enclosure extender of FIG. 7 with longitudinal and peripheral perimeter seals secured to the extender body of the telecommunications enclosure extender.

Referring to FIGS. 8-10, the base piece 90 and the cover piece 92 are configured to meet at longitudinal seams 113 positioned on opposite sides of the fiber passage/channel 86. The base piece 90 and the cover piece 92 preferably each extend from the first end 102 to the second end 104 of the extender body 100. As previously described, the base piece 90 and the cover piece 92 each define at least a portion of each one of the enlarged first and second sealing heads 80, 82. As previously indicated, the cover piece 92 and the base piece 90 can be separated from one another to allow access to the fiber passage 86 and to provide a wrap-around configuration with respect to optical fibers routed through the extender body 100. In the depicted example, the longitudinal seams 113 are parallel to one another.

Preferably, the longitudinal seams 113 define channels 114 for receiving longitudinal seam seals 115 (see FIG. 10). The longitudinal seam seals 115 fit within the channels 114 and extend along the longitudinal seams 113 for sealing between the base piece 90 and the cover piece 92. The channels 114 are defined by the base 90 and the cover 92 includes elongate sealing projections 93 that press into the seals 115 when the cover 92 is mounted on the base 90. It is preferred for the longitudinal seam seals 115 to contact the perimeter sealing material that surrounds the enlarged first and second sealing heads 80, 82 (e.g., material 89 shown at FIG. 10) at least when the enclosure extender 22 is installed between the first and second telecommunications enclosures 20*a*, 20*b*. As depicted at FIGS. 8-10, the enclosure body 100 defines sealing material openings 116 for providing communication between the longitudinal channels 114 containing the longitudinal seam seals 115 and the perimeter channels 112 for receiving the perimeter sealing material (e.g., material 89). The sealing material openings 116 are configured to provide for contact between the longitudinal seam seals 115 and the perimeter sealing material 89 to eliminate leak paths. In certain examples, the sealing material 89 also engages/contacts sealing material used to provide sealing between the bases and the covers of the enclosures 20a, 20b. In certain examples, sealing material can be provided within the fiber passage 86 (e.g., in internal pockets 91). This internal sealing material can optionally contact the perimeter sealing material (e.g., through one or more openings in the extender body).

The first and second telecommunications enclosures 20a, 20b each define a housing outer transverse cross-sectional profile defining a housing transverse cross-sectional area. The enlarged first and second sealing heads 80, 82 each define a sealing head transverse outer cross-sectional profile defining a head transverse cross-sectional area. Each of the head cross-sectional areas is preferably at least 75% as large as the corresponding housing transverse cross-sectional area.

The enlarged first sealing head 80 is configured to be connected to the first telecommunications enclosure 20a at first and second connection interfaces 120, 122 located at axially opposite sides of the enlarged first sealing head 80. Similarly, the enlarged second sealing head 82 is configured to be connected to the second telecommunications enclosure 20b at third and fourth connection interfaces 124, 126 located axially opposite sides of the enlarged second sealing head 82. The first and third connection interfaces 120, 124 are adapted to respectively align with the inner connection interfaces 48 of the first and second telecommunications enclosures 20a, 20b. Similarly, the second and fourth connection interfaces 122, 126 are adapted to align with the outer connection interfaces 50 of the first and second telecommunications enclosures 20a, 20b. The first connection interface 120 includes connection points 120a, 120b that align with connection points 48a, 48b of the inner connection interface 48 of the first telecommunications enclosure 20a, and the third connection interface 124 includes connection points 124a, 124b that align with the connection points 48a, 48b of the second telecommunications enclosure 20b. Similarly, the second connection interface 122 includes connection points 122a, 122b that respectively align with the connection points 50a, 50b of the outer connection interface 50 of the first telecommunications enclosure 20a and the fourth connection interface 126 includes connection points 126a, 126b that align with connection points 50a, 50b of the outer connection interface 50 of the second telecommunications enclosure 20b. In certain examples, the connection points define openings receiving fasteners (e.g., screws, bolts, etc.) that extend through the connection points and attach the opposite ends 102, 104 of the extender 22 respectively to the first and second telecommunications enclosure 20a, 20b.

Figure 11:
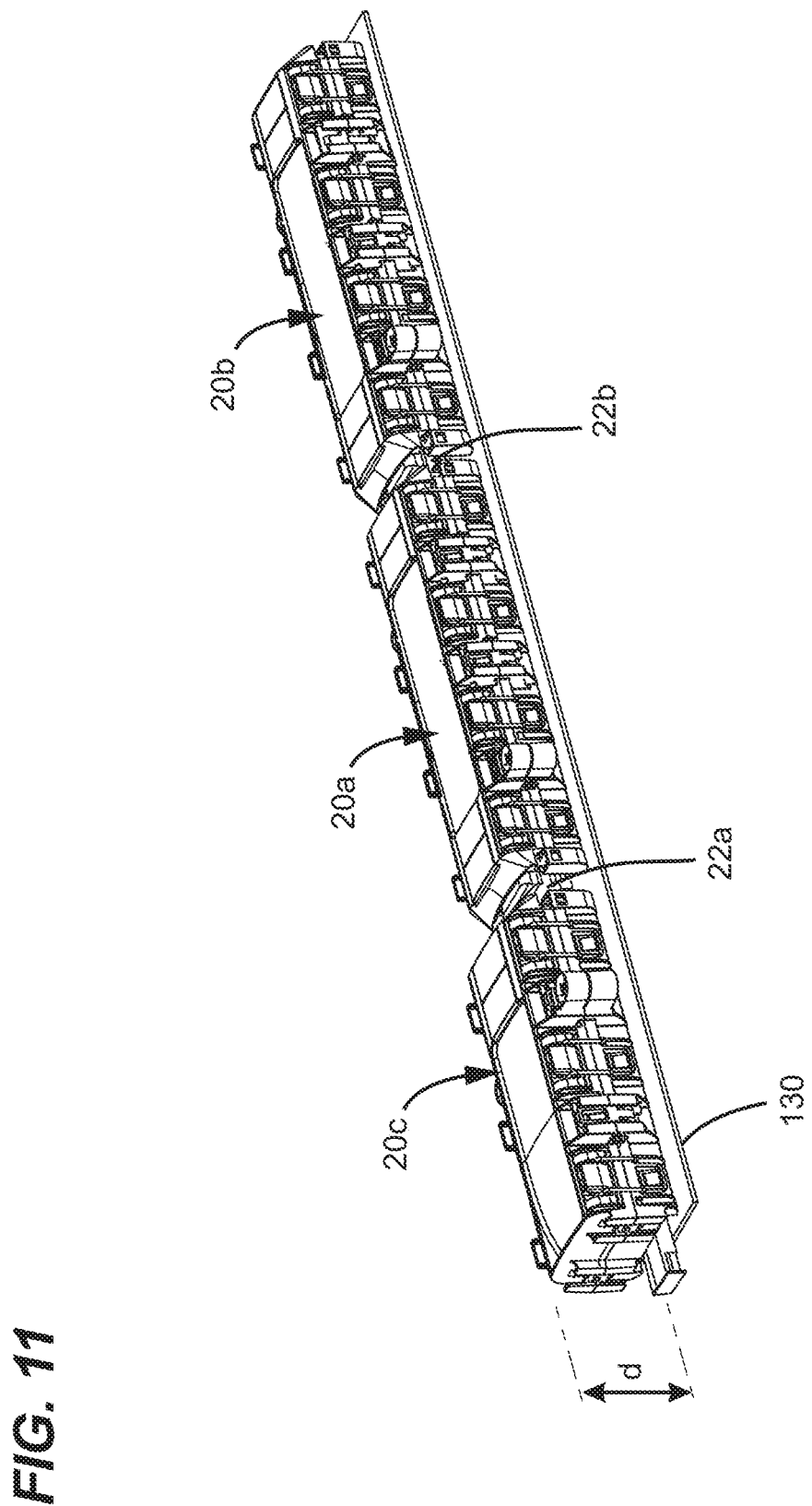
FIG. 11 depicts two in-line style telecommunications enclosures and a butt-style telecommunications enclosure coupled by telecommunications enclosure extenders in accordance with the principles of the present disclosure.
Figure 12:
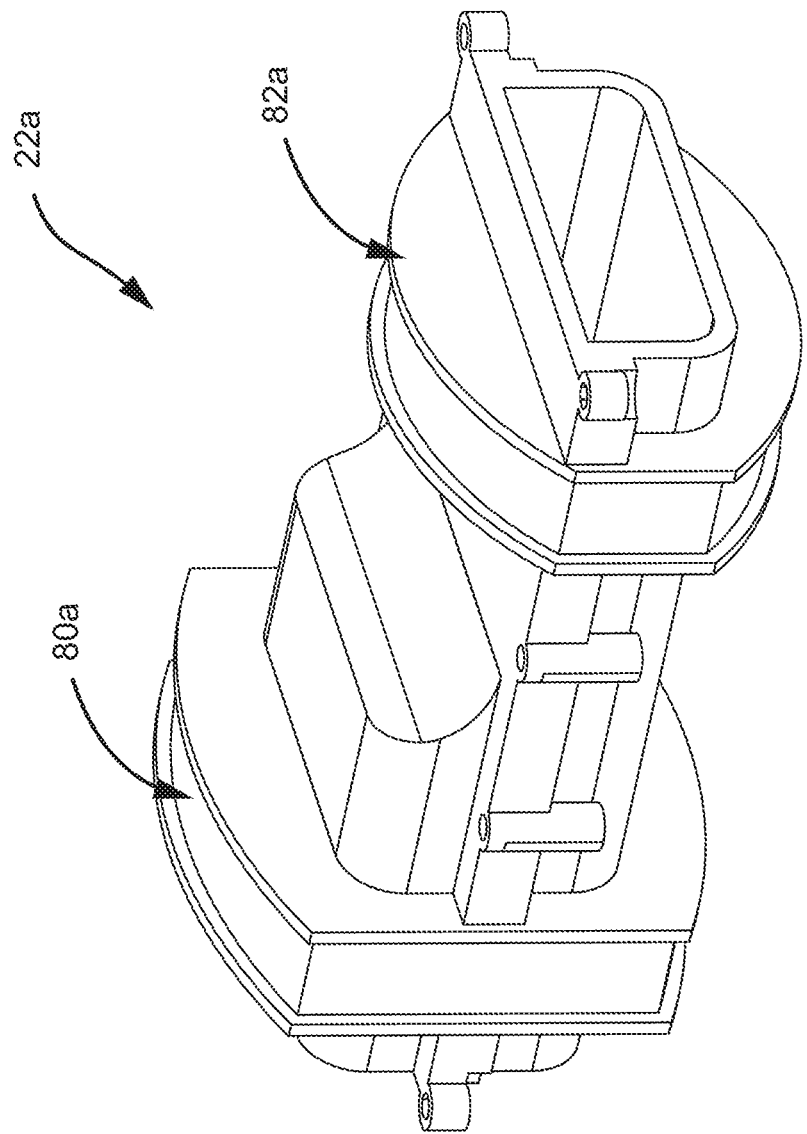
FIG. 12 is a perspective view of a telecommunications enclosure extender in accordance with the principles of the present disclosure for coupling the butt-style telecommunications enclosure of FIG. 11 to one of the in-line style telecommunications enclosures of FIG. 11.
Figure 13:
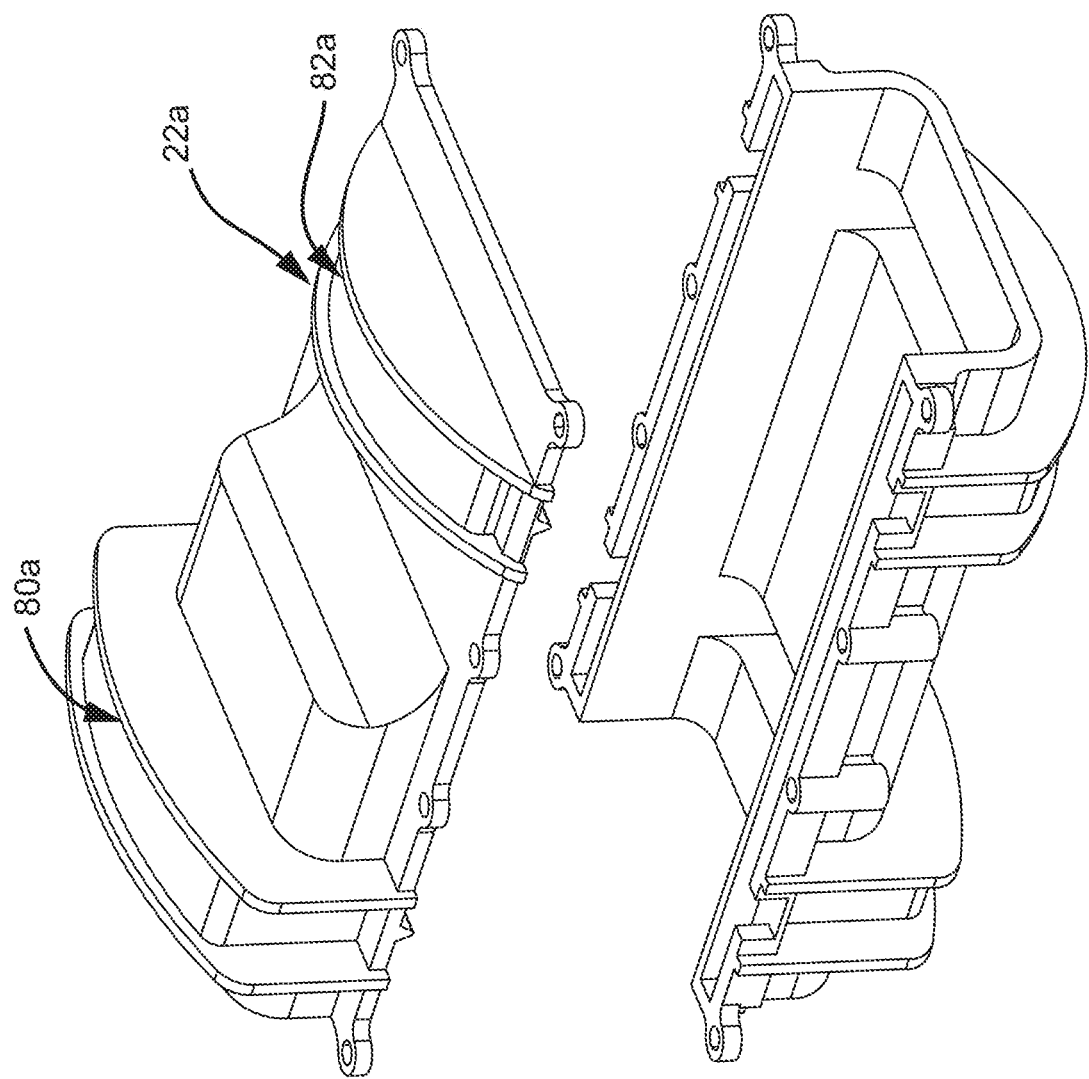
FIG. 13 is an exploded view of the telecommunications enclosure extender of FIG. 12.
Figure 14:
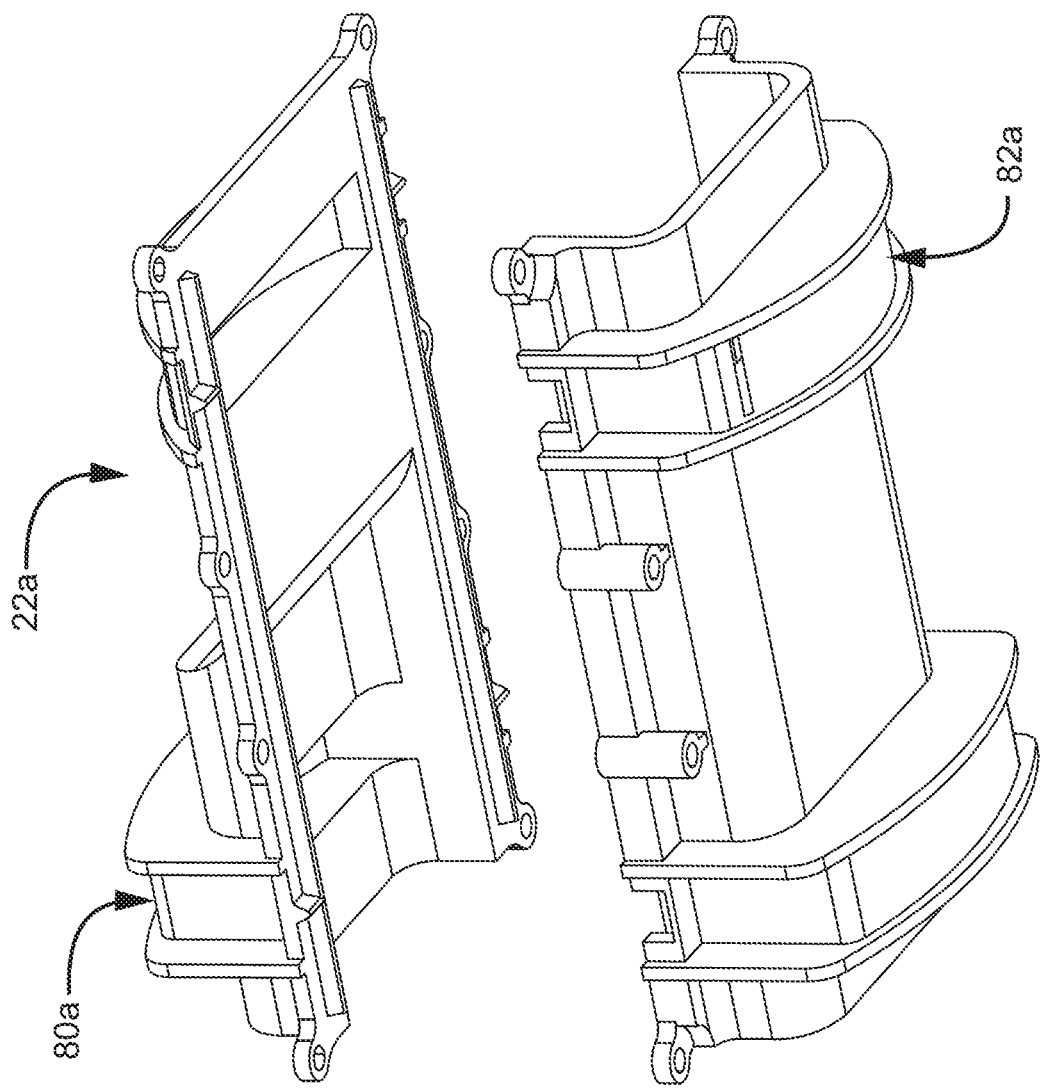
FIG. 14 is another exploded view of the telecommunications enclosure extender of FIG. 12.

FIGS. 12-14 show an alternative extender 22a having a similar configuration to the enclosure extender 22, except the extender 22a has an enlarged first sealing head 80a having an outer profile that is larger than the outer profile of an enlarged second sealing head 82a. Additionally, the outer profile of the enlarged first sealing head 80a is generally rectangular or oblong while the outer profile of the enlarged second sealing head 82a is generally oval. As shown at FIG. 11, the extender 22a is used to couple the left end of the first telecommunications enclosure 20a to a butt-style telecommunications enclosure 20c. Similar to the in-line telecommunications enclosures 20a, 20b, the butt-style telecommunications enclosure 20c includes a housing with a base and a removable cover that can be secured together by latches. The butt-style telecommunications enclosure 20c has the same width as the telecommunications enclosures 20a, 20b, but has a greater depth d than the telecommunications enclosures 20a, 20b. The enlarged size of the second sealing head 82a is sized to match with the greater depth of the internal profile defined by the third telecommunications enclosure 20c.

In certain examples, reinforcing structures can be used to prevent bending between the co-axially aligned enclosures 20a-20c. The reinforcing structures can have elongate configurations. Example reinforcing structures can include metal reinforcing members such as metal plates 130 or metal rods.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure.

What is claimed is:

1. A telecommunications enclosure extender for coupling a first telecommunications enclosure to a second telecommunications enclosure, the first and second telecommunications enclosures respectively including first and second cable sealing arrangement mounting locations for mounting cable sealing arrangements, the telecommunications enclosure extender comprising:
    an extender body having first and second opposite ends, the extender body having an internal fiber passage extending through the extender body from the first end to the second end, the extender body including an enlarged first sealing head positioned adjacent the first end, the enlarged first sealing head being configured to mount at the first cable sealing arrangement mounting location, the extender body including an enlarged second sealing head positioned adjacent the second end, the enlarged second sealing head being configured to mount at the second cable sealing arrangement mounting location, the extender body also including an intermediate section between the enlarged first and second sealing heads, the intermediate section having a reduced outer profile as compared to the enlarged first and second sealing heads, wherein a perimeter sealing material, that is softer than an extender body material, is mounted to the enlarged first and second sealing heads.

2. The telecommunications enclosure extender of claim 1, wherein the first and second telecommunications enclosures each include a re-enterable enclosure housing having a cover that mounts to a base, wherein the covers are removable from the bases to allow access to interiors of the enclosure housings, and wherein the first enlarged sealing head mounts between the cover and the base of the first telecommunications enclosure and the second enlarged sealing head mounts between the cover and the base of the second telecommunications enclosure.

3. The telecommunications enclosure extender of claim 1, wherein the enlarged first and second sealing heads have outer profiles which are the same.

4. The telecommunications enclosure extender of claim 1, wherein the enlarged first and second sealing heads have different outer profiles.

5. The telecommunications enclosure extender of claim 2, wherein the base and the cover of the first telecommunications enclosure housing cooperate to define a first inner profile that matches an outer profile of the enlarged first sealing head, and wherein the base and the cover of the second telecommunications enclosure cooperate to define a second inner profile that matches an outer profile of the enlarged second sealing head.

6. The telecommunications enclosure extender of claim 5, wherein the first and second inner profiles have the same size and shape.

7. The telecommunications enclosure extender of claim 1, wherein the extender body defines a central axis that extends between the first and second ends, wherein the extender body has a molded plastic construction, wherein the enlarged first and second sealing heads define sealing perimeters that extend around the central axis, and wherein the perimeter sealing material extends about the sealing perimeters.

8. The telecommunications enclosure of claim 7, wherein the perimeter sealing material is positioned radially outside the enlarged sealing heads.

9. The telecommunications enclosure of claim 8, wherein the enlarged sealing heads define perimeter channels that extend around the central axis for receiving the perimeter sealing material.

10. The telecommunications enclosure extender of claim 9, wherein the extender body includes first and second pieces that meet at longitudinal seams on opposite sides of the fiber passage, wherein the first and second pieces each extend from the first end to the second end of the extender body, wherein the first and second pieces each define at least a portion of the enlarged first sealing head and the enlarged second sealing head, and wherein the first and second pieces can be separated from one another to allow access to the fiber passage and to provide a wrap-around configuration with respect to optical fibers routed through the extender body.

11. The telecommunications enclosure extender of claim 10, further comprising longitudinal seam seals positioned along the longitudinal seams for sealing between the first and second pieces, wherein the longitudinal seam seals contact the perimeter sealing material surrounding the enlarged first and second sealing heads when the enclosure extender is mounted between the first and second telecommunications enclosures.

12. The telecommunications enclosure extender of claim 11, wherein the enclosure extender defines longitudinal channels for containing the longitudinal seam seals, and wherein the enclosure extender defines sealing material openings that provide communication between the longitudinal channels and the perimeter channels for providing contact between the longitudinal seam seals and the perimeter sealing material.

13. The telecommunications enclosure extender of claim 12, wherein the first and second pieces are coupled together by fasteners or a snap-fit connection.

14. The telecommunications enclosure extender of claim 1, wherein the first and second telecommunications enclosures each define a housing outer transverse cross-sectional profile defining a housing transverse cross-sectional area, wherein the enlarged first and second sealing heads each define a sealing head outer cross-sectional profile defining a head transverse cross-sectional area, and wherein each of the head cross-sectional areas is at least 75 percent as large as the corresponding housing transverse cross-sectional area.

15. The telecommunications enclosure extender of claim 1, wherein the enlarged first sealing head is configured to be connected to the first telecommunications enclosure at first and second connection interfaces located at axially opposite sides of the enlarged first sealing head, and wherein the enlarged second sealing head is configured to be connected to the second telecommunications enclosure at third and fourth connection interfaces located at axially opposite sides of the enlarged second sealing head.

16. The telecommunications enclosure extender of claim 15, wherein the first and second connection interfaces each include two fastening points, and wherein the third and fourth connection interfaces each include two fastening points.

17. The telecommunications enclosure extender of claim 16, wherein each of the fastening points includes an opening for receiving a fastener.

18. The telecommunications enclosure extender of claim 7, wherein the perimeter sealing material is a gel.

* * * * *